Figure 1:
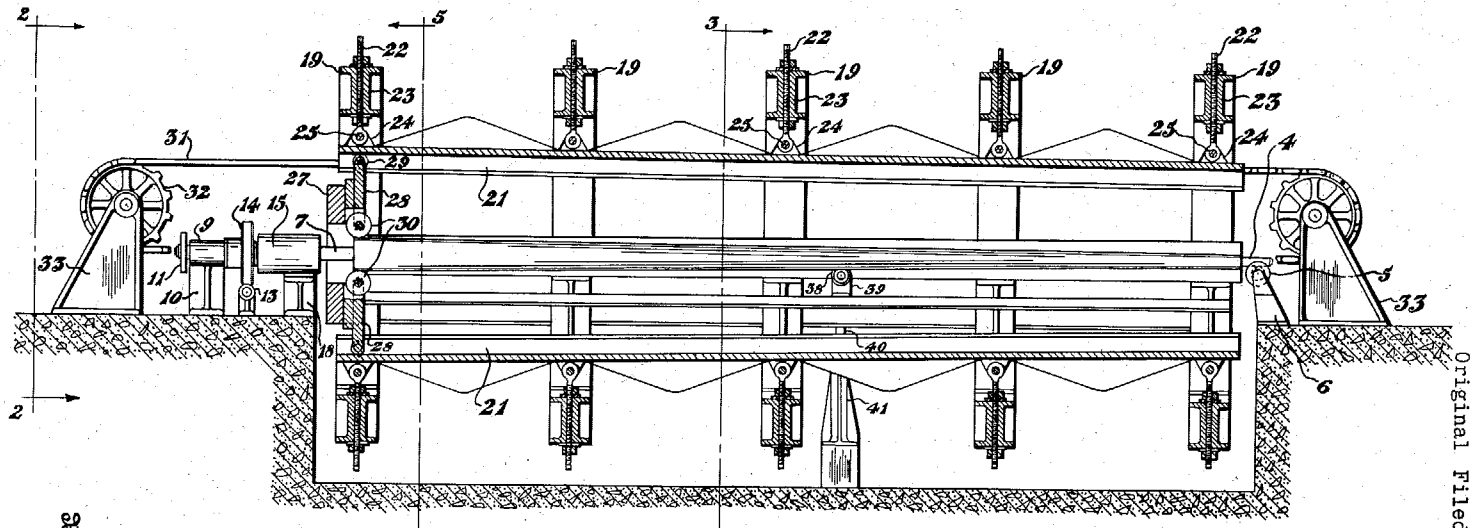

Aug. 20, 1929. C. A. FRAHM Re. 17,415

FLUTING MACHINE

Original Filed Sept. 9, 1926 4 Sheets-Sheet 1

Inventor

Carl A. Frahm

By Frease and Bond

Attorneys

Aug. 20, 1929.

C. A. FRAHM

FLUTING MACHINE

Re. 17,415

4 Sheets-Sheet 2

Original Filed Sept. 9, 1926

Inventor

Carl A. Frahm

By Frease and Bond

Attorneys

Aug. 20, 1929. C. A. FRAHM Re. 17,415

FLUTING MACHINE

4 Sheets-Sheet 3

Original Filed Sept. 9, 1926

Inventor

Carl A. Frahm

By Frease and Bond

Attorneys

Aug. 20, 1929.

C. A. FRAHM

FLUTING MACHINE

Re. 17,415

4 Sheets-Sheet 4

Original Filed Sept. 9, 1926

Inventor

Carl A. Frahm

By Frease and Bond

Attorneys

Reissued Aug. 20, 1929. Re. 17,415

UNITED STATES PATENT OFFICE.

CARL A. FRAHM, OF MASSILLON, OHIO, ASSIGNOR TO THE UNION METAL MANUFACTURING COMPANY, OF CANTON, OHIO, A CORPORATION OF OHIO.

FLUTING MACHINE.

Original No. 1,638,481, dated August 9, 1927, Serial No. 134,394, filed September 9, 1926. Application for reissue filed June 20, 1929. Serial No. 372,510.

The invention relates to machines for fluting sheet metal columns, such as are used for lamp standards, building columns, trolley poles, telegraph and telephone poles, and the like.

Applicant is aware that machines of various descriptions have been constructed for fluting columns formed of sheet metal, including machines for fluting columns formed of light gage sheet metal, by forming the flutes one at a time, over a stationary mandrel by means of a movable roller. With machines of this type the mandrel can only be supported at its ends and the pressure is only applied upon one side of the mandrel, making it impractical to flute any but very light gage sheet metal columns upon the same.

Machines such as disclosed in my application filed May 23, 1925, Serial No. 32,344, since matured into Patent No. 1,605,828, dated November 2, 1926, have also been constructed and such machines are capable of satisfactorily fluting columns of extremely heavy gage metal.

Owing to the present inclination to increase the height of columns for use as lamp standards and the like, it is necessary that the mandrel, upon which the column is fluted, be of considerable length, and owing to the fact that in the type of machine such as illustrated in my patent referred to, this mandrel must move longitudinally a distance at least equal to the length of the column, a considerable amount of floor space is required for each machine.

The present improvement contemplates a construction in which the mandrel remains stationary during the fluting operation, fluting rollers being passed longitudinally throughout the length of the column and engaging the same upon all sides, thus permitting the use of extremely heavy gage metal in the columns and at the same time considerably lessening the floor space occupied by the machine.

The present machine also eliminates the series of hydraulic cylinders and accumulators required in the apparatus such as disclosed in my patent above referred to, thus considerably lessening the cost of building and installing the same.

It is known that attempts have been made to form a plurality of flutes around a column in one operation, by placing the column upon a stationary mandrel, and moving an annular head longitudinally of the mandrel, cam or spring operated rollers being carried by the head and arranged to cooperate with the mandrel for fluting the column.

Machines of this latter type proved to be impractical in use, as owing to the uneven wear upon the cams or springs, it was impossible to maintain a uniform pressure upon all of the rollers throughout the entire operation, thus producing some flutes of less depth than others.

Since all of the rollers could not be held uniformly against the mandrel throughout the operation, irregularities in the fluting of the column were caused, making it impossible to flute a heavy gage column upon the same.

The object of the present improvement is to provide a fluting machine capable of fluting columns of heavy gage metal upon a stationary mandrel, a movable head being provided with rollers arranged to be moved longitudinally of the column to flute the same over the mandrel, inclined tracks being provided with means for readily adjusting the same to the taper of the column whereby the rollers are caused to bear uniformly upon the column throughout its entire length.

An embodiment of the invention is illustrated in the accompanying drawings, in which—

Figure 2:
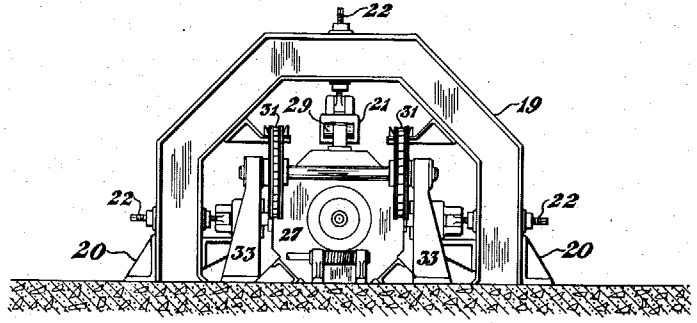
Figure 3:
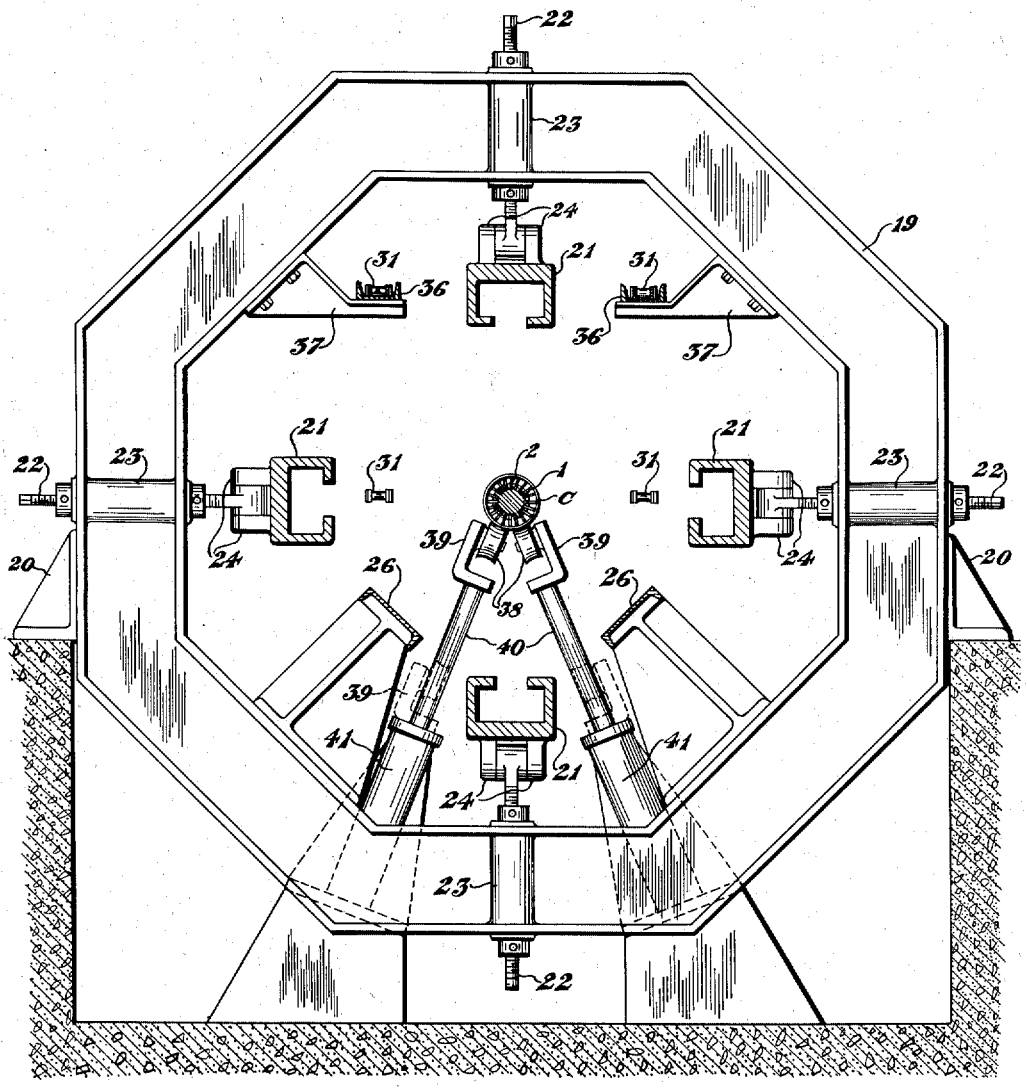
Figure 4:
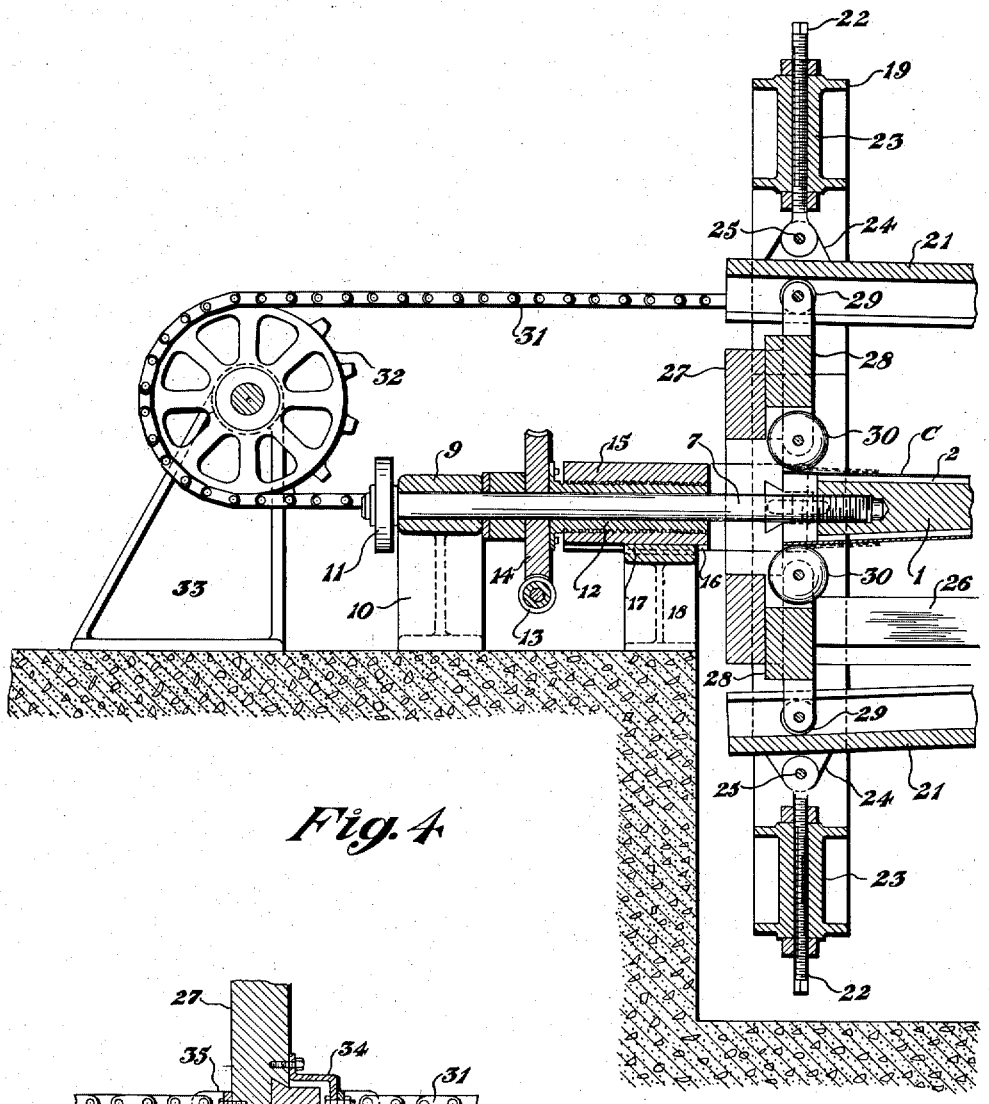
Figure 6:
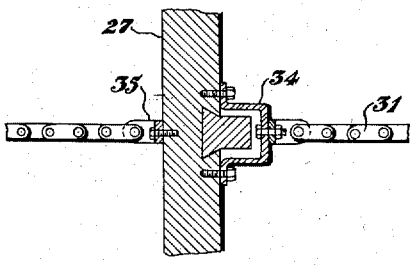
Figure 5:
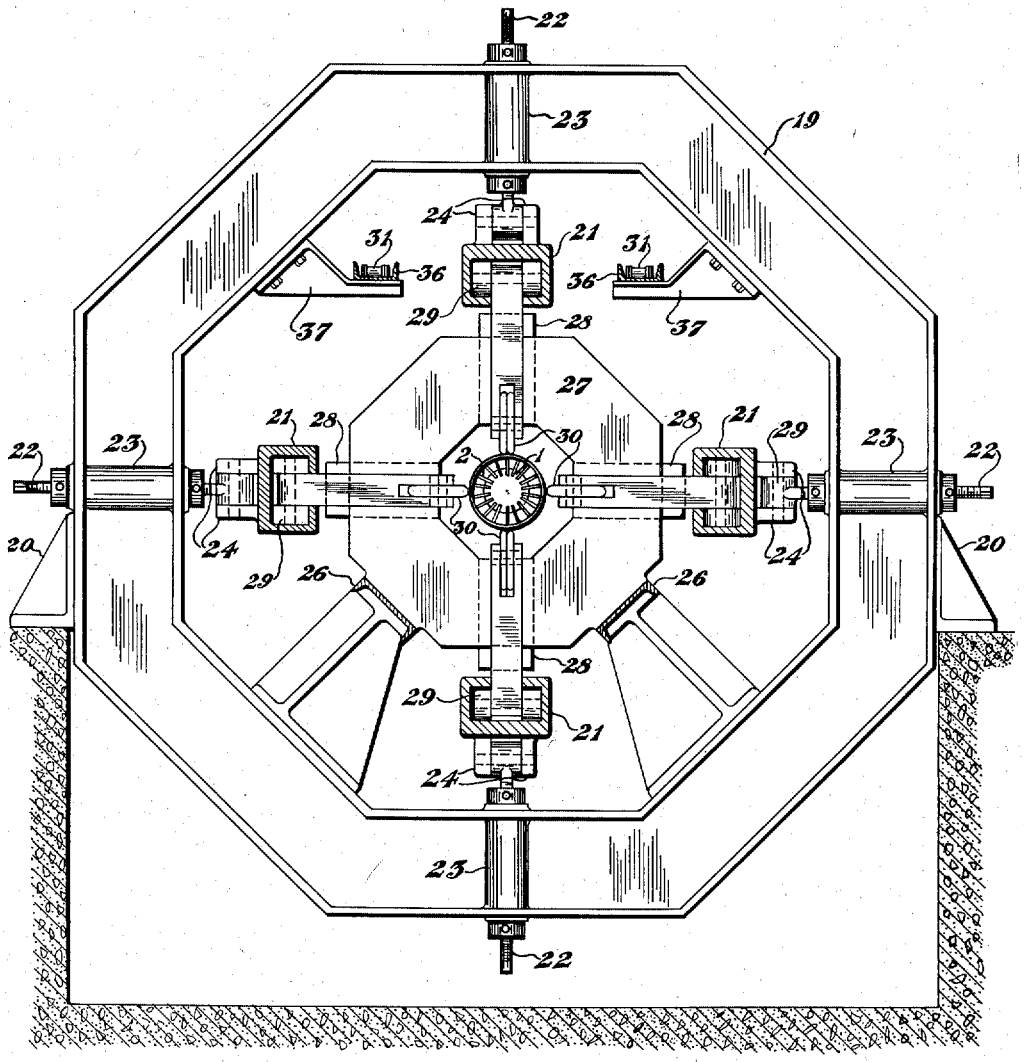

Figure 1 is a longitudinal sectional view of the improved fluting machine;

Fig. 2, an end elevation of the same;

Fig. 3, an enlarged section on the line 3—3, Fig. 1;

Fig. 4, an enlarged longitudinal section of one end portion of the machine showing the movable head;

Fig. 5, a section on the line 5—5, Fig. 1;

Fig. 6, a fragmentary detail view showing the connection of the chain to the movable head.

Similar numerals refer to similar parts throughout the drawings.

The mandrel, upon which the fluting of the sheet metal columns is performed, is shown as a tapered shaft 1 provided around its periphery with the ribs 2, the edges of which may be substantially V-shaped, and spaced apart the desired distance to produce tapered flutes of the proper width in the column.

A spindle 4 is fixed to one end of the mandrel and may be journaled as upon the grooved roller 5, carried in a bracket 6 supported from the floor. A spindle 7 is fixed in the other end of the column and journaled in the bearing 9 formed upon a bracket 10 also supported upon the floor.

A wheel 11 is preferably fixed upon the spindle 7 for the purpose of rotating the mandrel to the desired position before each fluting operation. In order to quickly and readily remove the fluted column from the mandrel a sleeve 12 is journaled upon the spindle 7 and arranged to be rotated as by the worm 13 and worm gear 14 which is fixed to the sleeve.

A nut 15 is threaded upon the sleeve 12 and provided with a keyway 16 engaged by a key 17 in the bracket 18 whereby rotation of the sleeve 12 in the proper direction will move the nut 15 into engagement with the large end of the column and loosen the same from the mandrel.

A plurality of ring frames 19 encircle the mandrel, at spaced intervals, from end to end thereof and are rigidly supported in upright position as by the brackets 20 which may be fixed to the floor in any suitable manner.

A plurality of guide tracks 21, preferably of substantially C-shape cross section, are adjustably carried by the frames 19 and surround the mandrel. These tracks may be adjusted toward or from the axle as by the screws 22 located through threaded bearings 23 in the frames and pivotally connected to the ears 24 upon the tracks, as by the pins 25.

By means of these screws the tracks 21 may be adjusted to the same taper as the mandrel. Guide rails 26 are located through the ring frames 19 forming a support upon which the head 27 may be moved longitudinally of the mandrel.

This head is provided with a plurality of radially movable plunger bars 28, corresponding in number to the tracks 21, a roller 29 being provided upon the outer end of each plunger for engagement in the corresponding track, and a forming roller 30 being carried upon the inner end of each plunger and arranged to cooperate with the mandrel to flute the sheet metal column C which is placed over the mandrel as illustrated in the drawings. As the forming rollers travel over the work as will later be described, pressure is applied thereto by the tracks 21 through the plunger bars 28, because of the direct contact of the bars with the track as by the rollers 29.

The head is arranged to be moved, longitudinally of the mandrel, by means of the chains 31, located through the ring frames 19 and over the sprocket wheels 32 journaled in bearings 33 mounted at each end of the machine. Each of these chains is connected at both ends to the sliding head 27 as by the U-bracket 34 and channel bracket 35 upon the front and rear sides of the head respectively. One of the sprockets 32 may be driven by any suitable means in order to move the chains over the same and slide the head 27 through the machine.

Channel guides 36 may be supported within the ring frames 19 as by the brackets 37 for the purpose of supporting the upper strands of the chains 31 as they move through the machine.

For the purpose of supporting the central portion of the mandrel, rollers 38 may be provided, being mounted in the L-brackets 39 upon the plungers 40. These plungers are mounted in the cylinders 41 and may be lowered into the dotted line position shown in Fig. 3, to permit the head 27 to pass over the central portion of the mandrel.

In the operation of the machine, a plain tapered sheet metal column, as indicated at C, is placed upon the mandrel 1, being formed tightly around the ribs 2 thereon.

The head 27 is then moved the entire length of the mandrel, by means of the chains 31 forming flutes and fillets in the column at intervals around the circumference. The column and mandrel may then be turned, by means of the wheel 11, a sufficient distance, upon its axis, to bring the next adjacent ribs of the mandrel into radial alignment with the rollers and the operation is thus repeated until all of the flutes have been formed in the column.

If desired, as shown in Fig. 5, the fluting and fillet forming rollers may alternate around the head, the fluting rolls cooperating with certain of the ribs of the mandrel to flute the column between the same while the fillet forming rolls cooperate with certain other ribs to form the desired fillets at these points.

After the column is completely fluted the nut 15 is moved toward the adjacent end of the mandrel, by means of the worm gearing 13—14, the nut engaging the large end of the column and pushing the same longitudinally upon the mandrel a sufficient distance to loosen the column permitting it to be withdrawn from the mandrel.

When a mandrel of different diameter or degree of taper is mounted in the machine the channel tracks 21 may be easily and quickly adjusted, to correspond to the size and taper of the mandrel, by operating the adjusting screws 22 in the ring frames.

I claim:

1. A fluting machine including a mandrel, tracks parallel to the mandrel, a movable head, plungers slidably mounted in the head and engaging said tracks, and forming rollers upon the plungers arranged to cooperate with the mandrel.

2. A fluting machine including a mandrel, tracks parallel to the mandrel, a movable head, plungers slidably mounted in the head and engaging said tracks, forming rollers upon the plungers arranged to cooperate with the mandrel and means for rotating the mandrel upon its axis.

3. A fluting machine including a tapered mandrel, tracks located parallel to the mandrel, a movable head, plungers slidably mounted in the head and engaging said tracks, and forming rollers upon the plungers arranged to cooperate with the mandrel.

4. A fluting machine including a tapered mandrel, tracks located paralell to the mandrel, a movable head, plungers slidably mounted in the head and engaging said tracks, forming rollers upon the plungers arranged to cooperate with the mandrel and means for rotating the mandrel upon its axis.

5. A fluting machine including a tapered mandrel, tracks located parallel to the mandrel, a movable head, plungers slidably mounted in the head, and engaging the tracks, alternate fluting and fillet-forming rollers upon the plungers arranged to cooperate with the mandrel, and means for rotating the mandrel upon its axis.

6. A fluting machine including a mandrel, tracks parallel to the mandrel, a movable head, plungers slidably mounted in the head and engaging said tracks, forming rollers upon the plungers arranged to cooperate with the mandrel and means for moving the tracks radially to the mandrel.

7. A fluting machine including a tapered mandrel, ring frames surrounding the mandrel, tracks carried by the ring frames and parallel to the mandrel, a movable head, plungers slidably mounted in the head and engaging said tracks, and forming rollers upon the plungers arranged to cooperate with the mandrel.

8. A fluting machine including a mandrel, ring frames surrounding the mandrel, adjustable members carried by the ring frames, tracks carried by the adjustable members and parallel to the mandrel, a movable head, plungers slidably mounted in the head and engaging the tracks, and forming rollers upon the plungers arranged to cooperate with the mandrel.

9. A fluting machine including a mandrel, ring frames surrounding the mandrel, screws in the ring frames, tracks carried by said screws and parallel to the mandrel, a movable head, plungers slidably mounted in the head and engaging said tracks, and forming rollers upon the plungers arranged to cooperate with the mandrel.

10. A fluting machine including a tapered mandrel, ring frames surrounding the mandrel, adjustable members carried by the ring frames, tracks carried by the adjustable members and parallel to the mandrel, a movable head, plungers slidably mounted in the head and engaging the tracks, and forming rollers upon the plungers arranged to cooperate with the mandrel.

11. A fluting machine including a tapered mandrel, ring frames surrounding the mandrel, screws in the ring frames, tracks carried by said screws and parallel to the mandrel, a movable head, plungers slidably mounted in the head and engaging said tracks, and forming rollers upon the plungers arranged to cooperate with the mandrel.

12. A fluting machine including a tapered mandrel, ring frames surrounding the mandrel, tracks adjustably carried in the ring frames and parallel to the mandrel, guide rails located through the ring frames, a movable head slidably mounted upon the guide rails, plungers slidably mounted in the head and engaging said tracks, and forming rollers upon the plungers arranged to cooperate with the mandrel.

13. A fluting machine including a mandrel, tracks parallel to the mandrel, a movable head, plungers slidably mounted in the head and engaging said tracks, forming rollers upon the plungers arranged to cooperate with the mandrel, and means for supporting the central portion of the mandrel arranged to be moved out of contact with the mandrel as the movable head is moved along the mandrel.

14. In a machine for fluting tapered metal columns, a mandrel, a head movable longitudinally of the mandrel, a track extending in the general direction of the mandrel, a bar mounted on the head, a fluting element carried upon the bar, and a roller carried on the bar and moving over the track, the pressure upon the elemnt being applied by the track through the direct contact of the roller on the bar with the track.

15. In a machine for fluting tapered metal columns, a tapering mandrel, a head movable longitudinally of the mandrel, a track extending longitudinally of the mandrel and converging therewith, a bar mounted on the head, a fluting roller on one end of the bar, and a roller on the opposite end of the bar bearing on the track, the pressure on the fluting roller through the bar being applied by the contact of the roller on the track.

16. In a fluting machine, a mandrel, a head movable longitudinally of the mandrel, a track extending longitudinally of the mandrel, a bar mounted on the head, and a fluting element on one end of the bar, the opposite end of the bar bearing directly against the track to apply pressure to the fluting element through the bar.

17. In a machine for fluting metal columns, a mandrel, a head movable relatively to the mandrel, a bar mounted on the head, a guide track, a forming roller on the bar, and a guide roller also mounted on the bar and movable over the guide track, the pressure upon the forming roller being applied by the track and the guide roller through the bar.

18. A fluting machine including a mandrel, tracks extending in the general direction of the mandrel, a movable head, bars movably mounted on the head, guide rollers mounted on the bars and engaging said tracks, and forming rollers upon the bars arranged to cooperate with the mandrel.

19. A fluting machine including a mandrel, tracks extending in the general direction of the mandrel, a movable head, bars movably mounted on the head and engaging said tracks, forming rollers upon the bars arranged to cooperate with the mandrel, and means for rotating the mandrel upon its axis.

20. A fluting machine including a tapered mandrel, tracks extending in the general direction of the mandrel, a movable head, bars movably mounted on the head and engaging said tracks, and forming rollers upon the bars arranged to cooperate with the mandrel.

21. A fluting machine including a tapered mandrel, tracks extending in the general direction of the mandrel, a movable head, bars movably mounted on the head and engaging said tracks, forming rollers upon the bars arranged to cooperate with the mandrel, and means for rotating the mandrel upon its axis.

22. A fluting machine including a tapered mandrel, tracks extending in the general direction of the mandrel, a movable head, bars movably mounted on the head and engaging the tracks, alternate fluting and fillet-forming rollers upon the bars arranged to cooperate with the mandrel, and means for rotating the mandrel upon its axis.

23. A fluting machine including a mandrel, tracks extending in the general direction of the mandrel, a movable head, bars movably mounted on the head and engaging said tracks, forming rollers upon the bars arranged to cooperate with the mandrel, and means for moving the tracks radially to the mandrel.

24. A fluting machine including a tapered mandrel, ring frame surrounding the mandrel, tracks carried by the ring frames and extending in the general direction of the mandrel, a movable head, bars movably mounted on the head and engaging said tracks, and forming rollers upon the bars arranged to cooperate with the mandrel.

25. A fluting machine including a mandrel, ring frames surrounding the mandrel, adjustable members carried by the ring frames, tracks carried by the adjustable members and extending in the general direction of the mandrel, a movable head, bars movably mounted on the head and engaging the tracks, and forming rollers upon the bars arranged to cooperate with the mandrel.

26. A fluting machine including a mandrel, ring frames surrounding the mandrel, screws in the ring frames, tracks carried by said screws and extending in the general direction of the mandrel, a movable head, bars movably mounted on the head and engaging said tracks, and forming rollers upon the bars arranged to cooperate with the mandrel.

27. A fluting machine including a tapered mandrel, ring frames surrounding the mandrel, adjustable members carried by the ring frames, tracks carried by the adjustable members and extending in the general direction of the mandrel, a movable head, bars movably mounted on the head and engaging the tracks, and forming rollers upon the bars arranged to cooperate with the mandrel.

28. A fluting machine including a tapered mandrel, ring frames surrounding the mandrel, screws in the ring frames, tracks carried by said screws and extending in the general direction of the mandrel, a movable head, bars movably mounted on the head and engaging said tracks, and forming rollers upon the bars arranged to cooperate with the mandrel.

29. A fluting machine including a tapered mandrel, ring frames surrounding the mandrel, tracks adjustably carried in the ring frames and extending in the general direction of the mandrel, guide rails located through the ring frames, a movable head slidably mounted upon the guide rails, bars movably mounted on the head and engaging said tracks, and forming rollers upon the bars arranged to cooperate with the mandrel.

30. A fluting machine including a mandrel, tracks extending in the general direction of the mandrel, a movable head, bars movably mounted on the head and engaging said tracks, forming rollers upon the bars arranged to cooperate with the mandrel, and means for supporting the central portion of the mandrel arranged to be moved out of contact with the mandrel as the movable head is moved along the mandrel.

CARL A. FRAHM.